Aug. 13, 1968   L. L. TROUTMAN   3,396,749
TEMPERATURE CONTROL HOT AND COLD WATER FAUCET ATTACHMENT
Filed July 14, 1965   2 Sheets-Sheet 2
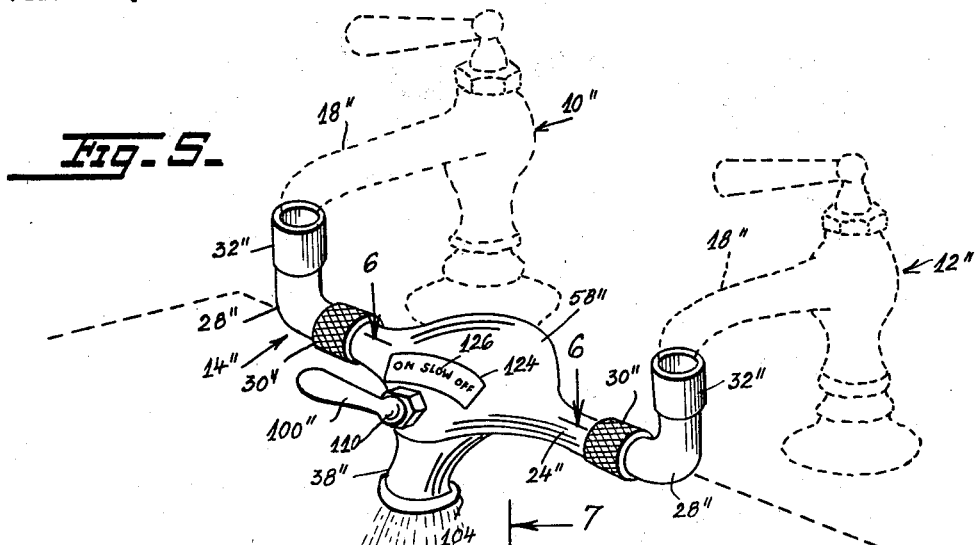
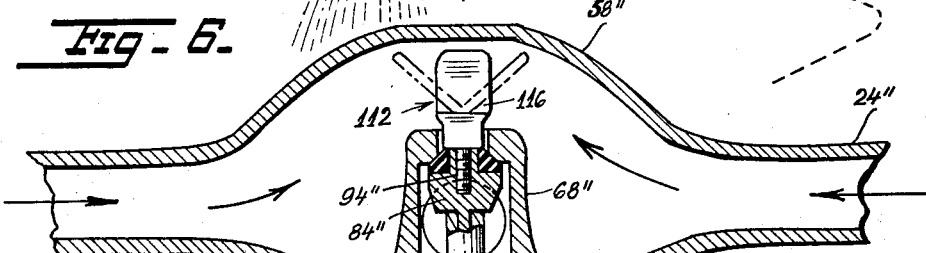
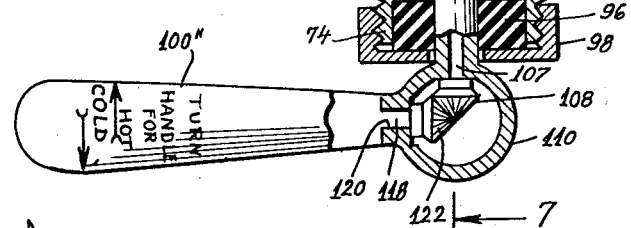
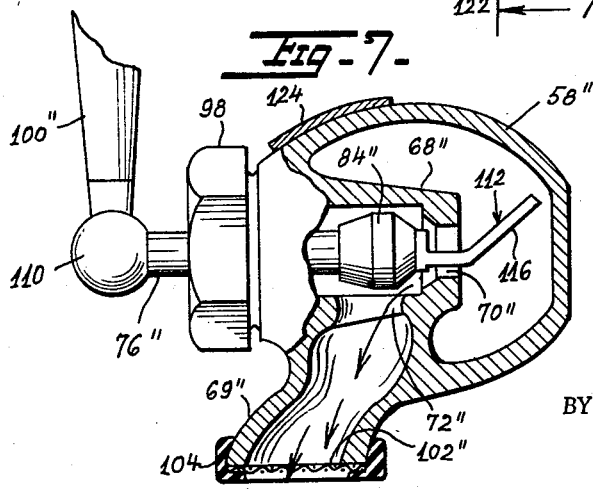
INVENTOR
Lena L. Troutman
BY Potachek & Saulsbury
ATTORNEYS.

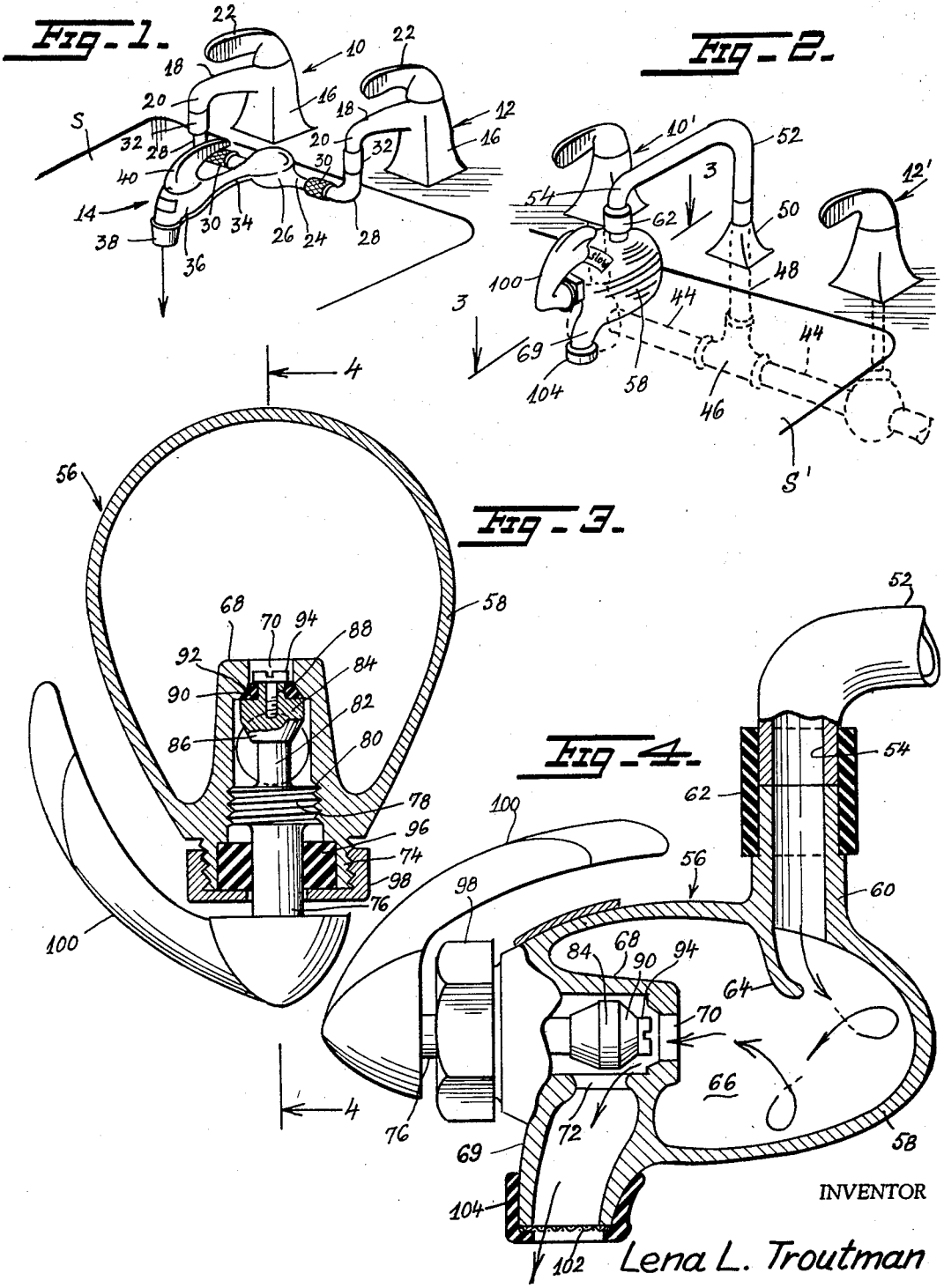

United States Patent Office 3,396,749
Patented Aug. 13, 1968

3,396,749
TEMPERATURE CONTROL HOT AND COLD
WATER FAUCET ATTACHMENT
Lena L. Troutman, 418 W. Monroe St.,
Salisbury, N.C. 28144
Filed July 14, 1965, Ser. No. 471,978
1 Claim. (Cl. 137—603)

ABSTRACT OF THE DISCLOSURE

An attachment for operatively joining separate hot and cold water faucets so as to deliver mixed hot and cold water controlled from a single valve to eliminate the need to adjust further the faucets once adjusted to the desired temperature. The attachment includes an elongated pipe with an enlargement midway its ends. Another pipe extends perpendicularly to the first pipe and is connected at one end to the enlargement. A mixing chamber is formed in the other end of the other pipe. The single valve is positioned in the chamber and an exterior handle actuates the mixing valve. Another attachment eliminates the elongated pipe and is adapted for connection to a single already mixed water spout, a valve head water deflecting device is provided in one attachment.

---

This invention relates to an attachment for joining separated hot and cold water spigots or faucets having a common single outlet faucet whereby the mixture of hot and cold water and the delivery of the mixed water are controlled.

A principal object of the present invention is to provide an attachment of this kind that is comfortable and convenient in use, that is economical in use and a saver of water.

Another object of the invention is to provide an attachment of this kind that is efficient in operation without wastage of water and without possibility of scalding by too hot water.

A further object of the invention is to provide an attachment of this kind with a mixing chamber and a single outlet faucet having a valve that is readily manipulated for turning the mixed water on and off without danger of leakage.

A specific object of the invention is to provide an attachment of this kind with means for protecting dishes from damage by contact therewith.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIGURE 1 is a perspective view of an attachment embodying one form of the invention applied to a pair of water spigots.

FIG. 2 is a perspective view of an attachment embodying a modified form of the invention applied to a pair of water spigots.

FIG. 3 is an enlarged sectional view taken on the plane of the line 3—3 of FIG. 2, the valve parts being shown in sealing position.

FIG. 4 is a vertical sectional view taken on the plane of the line 4—4 of FIG. 3, the valve parts being shown in "off" position.

FIG. 5 is a perspective view of an attachment embodying another modified form of the invention shown applied to a pair of water spigots, the spigots being shown in dash lines.

FIG. 6 is an enlarged sectional view taken on the plane of the line 6—6 of FIG. 5.

FIG. 7 is a vertical sectional view taken on the plane of the line 7—7 of FIG. 6.

FIG. 8 is a detail fragmentary perspective view of the water deflecting device.

Referring now more in detail to the drawings, in FIG. 1 there is shown a pair of hot and cold water spigot devices 10 and 12, respectively, connected by an attachment embodying the invention designated generally at 14. The spigot devices each comprises a hollow upstanding casing 16 and tubular spout 18 bent downwardly as indicated at 20 at its outer end. A handle 22 for actuating the spigot is rotatably mounted on the top of the casing. The spigot devices 10 and 12 are conventional in construction and operation.

In accordance with the invention, the spouts 18, 18 are connected by the improved attachment 14. The attachment 14 comprises a length of pipe 24 with an enlarged hollow head 26 midway its ends. Elbow joints 28, 28 connect the ends of the pipe 24 with the spouts 18, 18 internally threaded sleeves or coupling members 30 and 32 being sleeved over the abutting threaded ends of the pipe and elbows and the elbow and spouts, respectively. The head 26 constitutes a mixing chamber for the hot and cold water. Another pipe 34 is operatively and swivelly connected at its inner end to the head 26. The outer end of pipe 34 is enlarged forming a hollow head 36 containing valve mechanism for controlling the discharge of the mixed water through the discharge nozzle 38. The valve mechanism in the head 36 is actuated by a rotatable handle 40.

In operation, the attachment 14 is connected to the ends of the spigot or faucets 10 and 12 that are located in spaced relation over a sink S. The attachment is coupled by means of the sleeves or coupling members 32, 32. The hot and cold water will flow through the spouts 18, 18, through the elbows 28, pipe 24 to the head 26 where the hot and cold water is mixed and the mixed water discharges through pipe 34 to the head 36 and finally through nozzle 38.

In FIGS. 2 to 4, a modification of the invention is illustrated. In this form of the invention, the hot and cold water spigot devices or faucets 10' and 12', respectively, are shown connected by aligned pipes 44 connected by a T-fitting 46. An upstanding pipe 48 extends upwardly from the T-fitting to the top of the sink S' where it is connected to a hollow casing 50 which in turn is connected to an L-shaped pipe 52 bent downwardly at its outer end as indicated at 54. The outer bent end of the L-shaped pipe 52 is connected to a valve device 56. The valve device 56 comprises a bulbous casing 58 having an inlet 60 on its top side connected to the bent end 54 of the L-shaped pipe 52 by means of a rubber coupling member 62. An integral lip 64 is formed at one end of the casing where the inlet 60 intersects the body of the casing, deflecting the mixed water into a mixing chamber 66 constituted by the wall of the casing, and the wall of an inwardly projecting tubular housing 68 formed on the other end of the body of the casing. A tubular discharge nozzle 69 is formed by the wall of the tubular housing 68 and extends perpendicularly to the axis of the casing 58 and outwardly thereof, extending therebelow. An opening 70 is formed in the inner end of the tubular housing 68, communicating with the mixing chamber 66 and another opening 72 is formed in the housing 68 communicating with the interior of the nozzle 69 whereby a circuitious path is provided for the mixed water to pass from the mixing chamber 66 through the housing 68 and through the discharge nozzle 69.

The passage of the mixed hot and cold water from the mixing chamber 66 to the discharge nozzle 69 is controlled by valve mechanism housed in the housing 68 and extending through an externally threaded extension 74 on the other end of the casing. This valve mechanism includes an elongated round stem 76 extending through the tubular housing 68. Midway its ends, the stem is formed with an enlarged cylindrical portion formed with external screw threads 78 engaging internal screw threads 80 formed on the inner surface of the tubular housing 68. Inwardly of the enlarged screw threaded portion, the stem is formed with a portion 82 restricted in diameter, and formed on the outer end of the restricted portion 82 there is an enlarged head portion 84 being tapered at one end 86. The other end of the head portion 84 has a flat surface with a central restricted cylindrical extension 88 around which is an annular rubber gasket 90 formed with a tapered outer surface adapted to fit against a tapered inner surface 92 formed on the adjacent end of the housing 68 whereby the opening 70 in the end of the housing 68 is sealed. A broad headed screw 94 extending centrally through the extension 88 holds the gasket 90 in place. At its outer end, the stem 76 passes through a rubber gasket 96 seated in the open end of the casing 58 and is held in place by dish-shaped nut 98 threaded onto the threaded open end of the casing. A curved actuating handle 100 is fixedly secured to the outer end of the stem 76 for turning the stem, whereby the head of the valve is moved to closed sealing position as shown in FIG. 3 or to open position as shown in FIG. 4. A filtering screen 102 is preferably secured to the outer end of the discharge nozzle 69 by means of a rubber cap 104 which also serves to protect dishes and the like against damage when contacting the nozzle.

Referring now to the modification of the invention shown in FIGS. 5 to 8, inclusive, herein an attachment 14″ embodying a modified form of the invention is shown connected to a pair of separated spigots or faucets 10″ and 12″ shown in dash lines. The attachment 14″ includes a pipe 24″ and elbow joints 28″ with sleeves or coupling members 30″ and 32″ connecting the elbows to the pipe 24″ and spouts 18″ of the spigots or faucets 10″ and 12″. In this form, the pipe 24″ is formed with an enlarged head 58″ midway its ends, but the head 58″ discharges directly downwardly through a discharge nozzle 38″. The head 58″ serves as the mixing chamber for mixing the hot and cold water from the spigots 10″ and 12″ and also serves to house the valve mechanism encased in housing 68″ similar to housing 68 of FIG. 3. The valve mechanism is somewhat similar to the valve mechanism shown in FIG. 3 and similar reference numerals are used to indicate similar parts.

However, a stem 76″ of FIG. 6 rotatably supports a shaft 107 and a bevel gear 108 on its bottom end, which bottom end is integral with a hollow spherical extension 110, with the gear 108 inside. The top end of the stem 76″ has a screw member 94″ embedded in the head 84″. The screw member at its outer end supports a deflecting device 112 including a disc 114 secured to the screw member and a rectangular shaped plate 116 extending from the peripheral edge of the disc 114. The deflecting device 112 and head 84″ is adapted to be rotated for deflecting the hot and cold water to guided and controlled mixing of said water in the head 58″. The deflecting device is turned by means of an elongated round handle 100″ extending perpendicularly to the plane of the axes of the stem. The handle has a round restricted inner end 118 loosely fitted in a round hole 120 in the spherical extension 110 on the bottom end of the stem 76″. A bevel gear 122 is fixed on the end of the round inner end 118 inside the spherical extension 110 and meshes with the vertically disposed bevel gear 108 on the bottom end of stem 76″. By journalling the handle 100″ on its round end 118 the bevel gear 122 will turn causing turning of the bevel gear 108 and shaft 107 and consequent turning of the head 84″ and the deflecting device 112 for guiding and controlling the mixing of the hot and cold water in the head 58″. The mixed water passes downwardly from the head 58″ through the opening 70″ in the housing 68″, through the housing, through opening 72″ in the housing and downwardly through the discharge nozzle 69″ where it passes through the screen 102″. A plate 124 on the outside of the head 58″ bears indicia 126, such as "on," "slow," "off," indicating the condition of the valve mechanism.

The present invention is suitable for connection to spigots or faucets that have hot and cold spigots but only one faucet outlet, found in, for example, kitchen sinks, bath tubs, wash basins and laundry equipment.

While I have illustrated and described the preferred embodiments of my invention, it is to be understood that I do not limit myself to the precise constructions herein disclosed and that various changes and modifications may be made within the scope of the invention as defined in the appended claim.

What is claimed is:

1. An attachment for connecting a pair of spaced separate hot and cold water faucets having spout means, said attachment comprising a hollow enlargement and pipe fitting means adapted to removably attach the attachment to the hot and cold faucet spout means, said hollow enlargement constituting a chamber for mixing the hot and cold water, integral discharge nozzle depending from the hollow enlargement, a hollow housing projecting into the mixing chamber, said housing having an opening communicating with the mixing chamber, valve mechanism in the housing for controlling the passage of mixed water from the mixing chamber to the discharge nozzle, handle means exteriorly of the enlargement for actuating said valve mechanism, said valve mechanism includes an elongated stem, an integral enlargement on one end constituting a head, a sealing gasket carried by the head for sealing off the opening in the housing, said housing having internal screw threads intermediate its ends, said stem having external screw threads meshing with the threads on the housing for reciprocal movement of the stem, means for rotating the head including a shaft on the head and extending through the stem and a bevel gear on the outer end of the shaft, a handle journalled in a fixed portion of the enlargement, a bevel gear fixed on the inner end of the handle in mesh with the bevel gear on the shaft whereby turning of the handle about its longitudinal axis turns the shaft and head and turning the handle and the stem about the longitudinal axis of the stem reciprocates the valve head to "on" and "off" positions relative to the opening in the housing, a rotatable deflecting device operatively connected to the valve head and extending into the mixing chamber to guide and control mixing of the water therein, said rotatable deflecting device consists of a disk with a coaxial screw fixed to the valve head and a rectangular shaped plate extending angularly from the peripheral edge of the disk.

References Cited

UNITED STATES PATENTS

| | | | |
|---|---|---|---|
| 914,400 | 3/1909 | Firth | 137—606 |
| 1,758,552 | 5/1930 | Allen et al. | 251—250.5 X |
| 2,100,165 | 11/1937 | Holmberg et al. | 239—590.3 X |
| 2,218,662 | 10/1940 | Smith | 137—604 X |
| 2,511,291 | 6/1950 | Mueller | 137—604 |
| 2,548,071 | 4/1951 | Saulsberry | 137—605 X |
| 2,642,890 | 6/1953 | Skewis | 251—248 X |
| 2,828,766 | 4/1958 | Postmus | 137—604 X |

FOREIGN PATENTS

| | | |
|---|---|---|
| 215,913 | 2/1960 | Austria. |

WILLIAM F. O'DEA, *Primary Examiner.*

D. H. LAMBERT, *Assistant Examiner.*